US006421741B1

(12) United States Patent
Minyard

(10) Patent No.: US 6,421,741 B1
(45) Date of Patent: Jul. 16, 2002

(54) SWITCHING BETWEEN ACTIVE-REPLICATION AND ACTIVE-STANDBY FOR DATA SYNCHRONIZATION IN VIRTUAL SYNCHRONY

(75) Inventor: Trenton Corey Minyard, Richardson, TX (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/416,832

(22) Filed: Oct. 12, 1999

(51) Int. Cl.$^7$ .............................. G06F 1/12; G06F 11/00
(52) U.S. Cl. ........................................ 709/400; 714/12
(58) Field of Search ........................ 709/400; 713/400; 714/2, 3, 4, 10, 11, 12, 13, 15

(56) References Cited

U.S. PATENT DOCUMENTS

| | | | | |
|---|---|---|---|---|
| 5,781,910 A | * | 7/1998 | Gostanian et al. | 707/201 |
| 5,910,984 A | * | 6/1999 | Low | 379/279 |
| 5,974,114 A | * | 10/1999 | Blum et al. | 379/9 |
| 6,292,905 B1 | * | 9/2001 | Wallach et al. | 714/4 |
| 6,345,282 B1 | * | 2/2002 | Minyard | 707/204 |

OTHER PUBLICATIONS

Sape Mullender, "Distributed Systems," Second Edition, ACM Press, New York, New York (1993), pp. 199–216.

Fred B. Schneider, "Implementing Fault–Tolerant Services Using the State Machine Approach: A Tutorial,"+01 *ACM Computing Surveys*, vol. 22, No. 4 (Dec. 1990), pp. 300–319.

* cited by examiner

*Primary Examiner*—Dennis M. Butler
(74) *Attorney, Agent, or Firm*—Carr Law Firm, L.L.P.

(57) ABSTRACT

Disclosed is a method and apparatus for causing CPUs comprising portions of a fault tolerant process group to operate in an active-standby mode when synchronizing newly on-line CPUs and reverting to an active-replication mode when synchronization is complete. The above is accomplished in one embodiment of the invention by continuing to operate the primary processor in the active-standby mode and updating the newly online CPUs in accordance with a single pass intelligent update algorithm. When synchronization is complete, a message is transmitted to all CPUs in the group causing a reversion to an active-replication mode for all CPUs whether primary or standby. Any already synchronized CPUs that were in a standby mode, when the group is switched to an active-standby mode, are only updated by check-point message data as data synchronization updating record messages being supplied to a newly online CPU are ignored by these already synchronized standby CPUs.

13 Claims, 9 Drawing Sheets

SWITCHING BETWEEN ACTIVE-REPLICATION AND ACTIVE-STANDBY FOR DATA SYNCHRONIZATION IN VIRTUAL SYNCHRONY

TECHNICAL FIELD

The present invention relates in general to synchronization of a plurality of CPUs in a fault tolerant system and in particular to methods and systems for establishing synchronization between a primary CPU and a newly added backup CPU where the CPU units are normally operating in an active-replication mode.

BACKGROUND

There are many types of fault tolerant groups of central processor units (CPUs). Two of these are designated in the art as active-replication and active-standby.

These fault tolerant systems are widely known and are discussed in various periodicals and books. A good reference on the subject is in a book entitled "Distributed Systems (Second Edition)" authored by Sape Mullender, published by Addison-Wesley Publishing Company and copyrighted in 1993, and incorporated herein by reference in its entirety. Active-replication and active-standby are among the subjects discussed. In particular, the material on pages 97–138 and 464–481 of "Distributed Systems" is believed pertinent as background material. More detail on one active-standby system may be found in a patent application having Ser. No. 09/408,619, filed Sep. 30, 1999, now U.S. Pat. No. 6,345,282, entitled "MULTI-PROCESSOR DATA SYNCHRONIZATION METHOD AND APPARATUS" to Corey Minyard, assigned to Nortel Networks Corporation, and incorporated herein by reference in its entirety. Total order systems are also discussed in both the referenced book and the referenced co-pending application.

An active-replication system, once a primary or active CPU is synchronized to all backup CPU(s), operates upon the principle that all incoming messages and data are received and manipulated in the same manner by all CPUs in the group. In other words the backup CPUs are doing exactly the same processing as is the primary CPU. A problem with such a system is that applications running in such prior art systems can not be synchronized without stopping processing during the synchronization. Additionally, if no transactional messages are to be lost, such messages must be stored in very large message queues for all CPUs involved while synchronization is taking place. Thus while an active-replication system has very desirable normal operation characteristics, the synchronization characteristics leave a great deal to be desired.

An active-standby system, once synchronized, passes check-point messages from the primary CPU to all backup CPUs to update the data in each of the backup CPU databases. Additionally, each backup CPU maintains a list of messages to be processed that are received at the same time that the primary CPU receives the message. The messages to be processed are discarded by the backup CPU(s) when the backup CPU receives a check-point message corresponding to the message to be processed. Many prior art active-standby systems having backup CPUs have required the stoppage of processing of incoming messages while data is being synchronized.

Other prior art methods of obtaining synchronization involve the transfer of all the data records of the primary CPU to the newly online backup CPU enough times to make sure that all the records that were changed during the first transfer have been properly updated in the backup CPU.

The referenced co-pending patent application operates in accordance with the idea of continuing processing by the main CPU while it is bringing a new backup CPU into synchronization. This is accomplished by having all external messages, received by the backup CPU subsequent to the commencement of data synchronization and that are to be processed by the primary CPU, stored in a message list of the backup CPU. Check-point message data is intelligently stored by first deleting related external messages from message list storage and then creating a record if none exists and filling only those fields referenced in the check-point message. If, on the other hand, a record does exist, only the check-point message data fields are altered in that existing record. When a data synchronization record is received by the backup CPU, a check is made to see if such a record has already been created by a check-point message. If not, a record is created in the backup CPU database and all the fields are made to correspond with the received data synchronization record message. If such a record is found, only those fields not already containing check-point data are filled from the received data synchronization record message. In this manner a single pass through the primary CPUs database is sufficient to obtain data synchronization of the backup CPU.

In a cellular telephone system, involving thousands of customers, the data transfer time required to synchronize a newly online backup CPU, while the system is running, may take many hours when using prior art synchronization approaches. In such a system, the large data stores, high transaction rates and low downtime requirements mandates that newly online backup CPUs be able to synchronize without special memory or queuing requirements and in a minimal time. Known prior art active-replication systems either stop processing or do message queuing during synchronization. Such fault tolerant system limitations can not be tolerated in the environment of present day cellular telephone systems.

Since active-replication systems eliminate the requirement of passing check-point messages from the primary CPU once a backup CPU is synchronized, the primary CPU has more time available for processing data than do active-standby systems having the same theoretical processing power. It would thus be desirable for an active-replication system to be able to synchronize a backup CPU to a primary CPU without discontinuing processing and without requiring hardware to maintain an extremely large message queue while performing such a synchronization.

SUMMARY OF THE INVENTION

The present invention accordingly provides an active-replication system which can synchronize a backup CPU to a primary CPU without discontinuing processing and without requiring hardware to maintain an extremely large message queue while performing such a synchronization. To that end, the present invention comprises a fault tolerant processing system using total order, having a primary CPU normally operating in an active-replication mode, and a backup CPU interconnected to the primary CPU and that requires synchronization with the primary CPU. An "add me" request signal is sent from the backup CPU to the primary CPU to cause the primary CPU to temporarily switch to an active-standby mode. A "finished" signal is sent from the primary CPU to the backup CPU when copies of all data synchronization records have been transmitted to the backup CPU. Both the primary and the backup CPUs are caused to revert to an active-replication mode substantially immediately after transmission of the "finished" signal.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
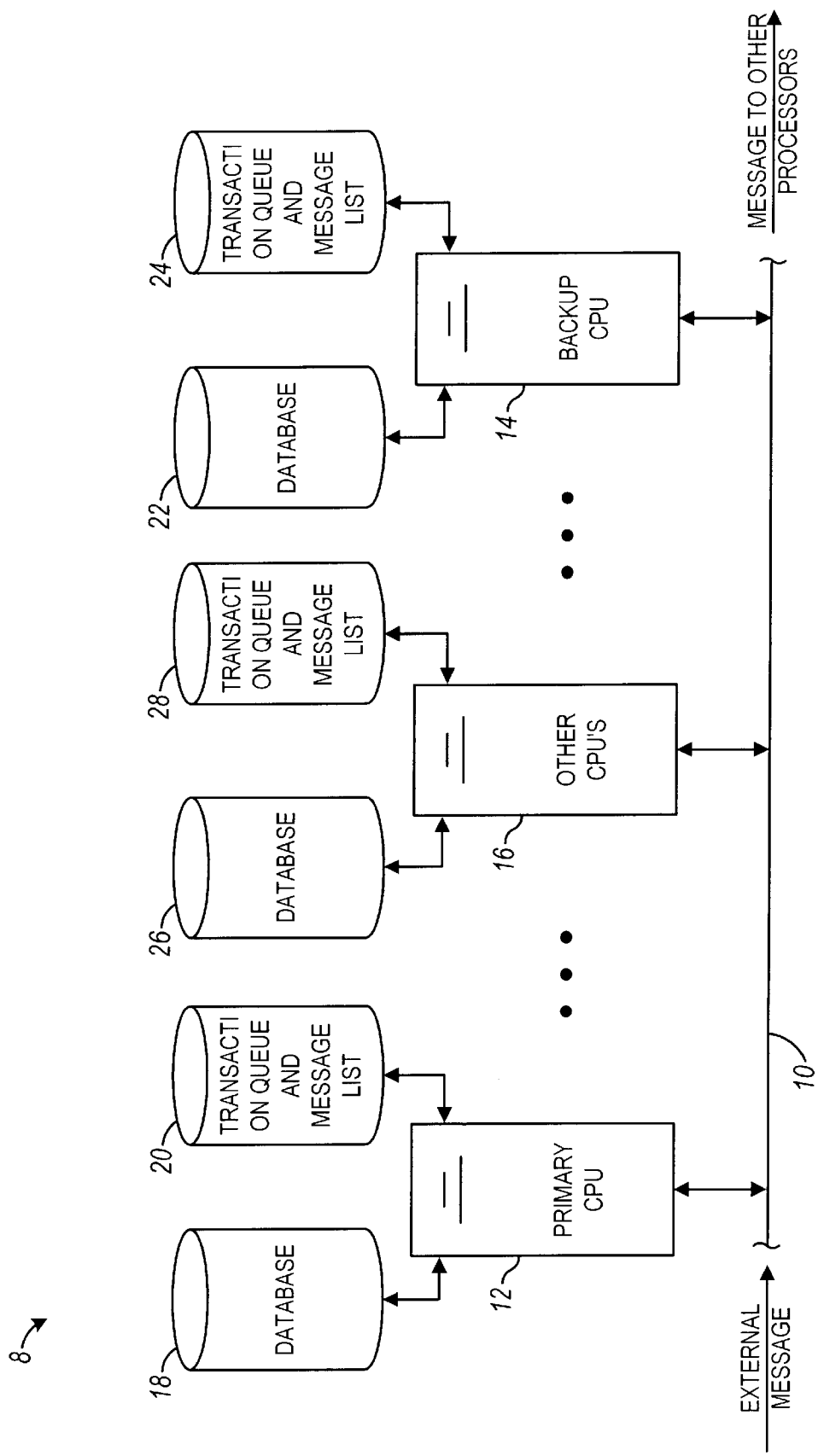
FIG. 1 is a block diagram of a portion of a communication network link interconnecting a primary CPU and at least one backup CPU as part of a fault tolerant system.

Referring to FIG. 1 of the drawings, the reference numeral 8 generally designates a fault tolerant data communication network utilizing total order and embodying features of the present invention. The system 8 includes a common communication link or line 10 connected to a primary or active CPU 12 and to a backup CPU 14. This representation holds for both active-replication and active-standby systems and further applies whether or not the backup CPU 14 has been or is being synchronized with CPU 12. Link 10 in one embodiment of the invention transmits data in serial format but in some applications it may be desirable to use a parallel communication link. Link 10 is also connected to a source of external messages (not shown), is connected to other CPUs 16 and may supply messages to other processors not shown. One or more other CPUs 16 may be provided as additional backup CPUs that are already synchronized with CPU 12 or awaiting such synchronization. A common configuration for link 10 is in the form of a broadcast network including a gateway to connect to other networks. A token passing network configuration given the designation of TOTEM is often used for reliable data message transfer in such networks. However the type of network is not pertinent to the working of the present invention. In the application of the present invention to a cellular system, the source of external messages may be administrative computers in the system, the cellular phones themselves or other system resources. As shown, the CPU 12 maintains a database 18 comprising a plurality of records and a combination transaction queue and message list 20 typically comprising a plurality of unprocessed messages or transactions. Backup CPU 14 includes storage capability for a database 22 and a combination transaction queue and message list 24. As will be apparent, the database 22 would contain no records and no external messages or transactions at the start of synchronization after CPU 14 had previously failed and had been taken off line. Each of the other CPUs 16 also include storage capability for a database 26 and a transaction queue and message list 28.

Figure 2:
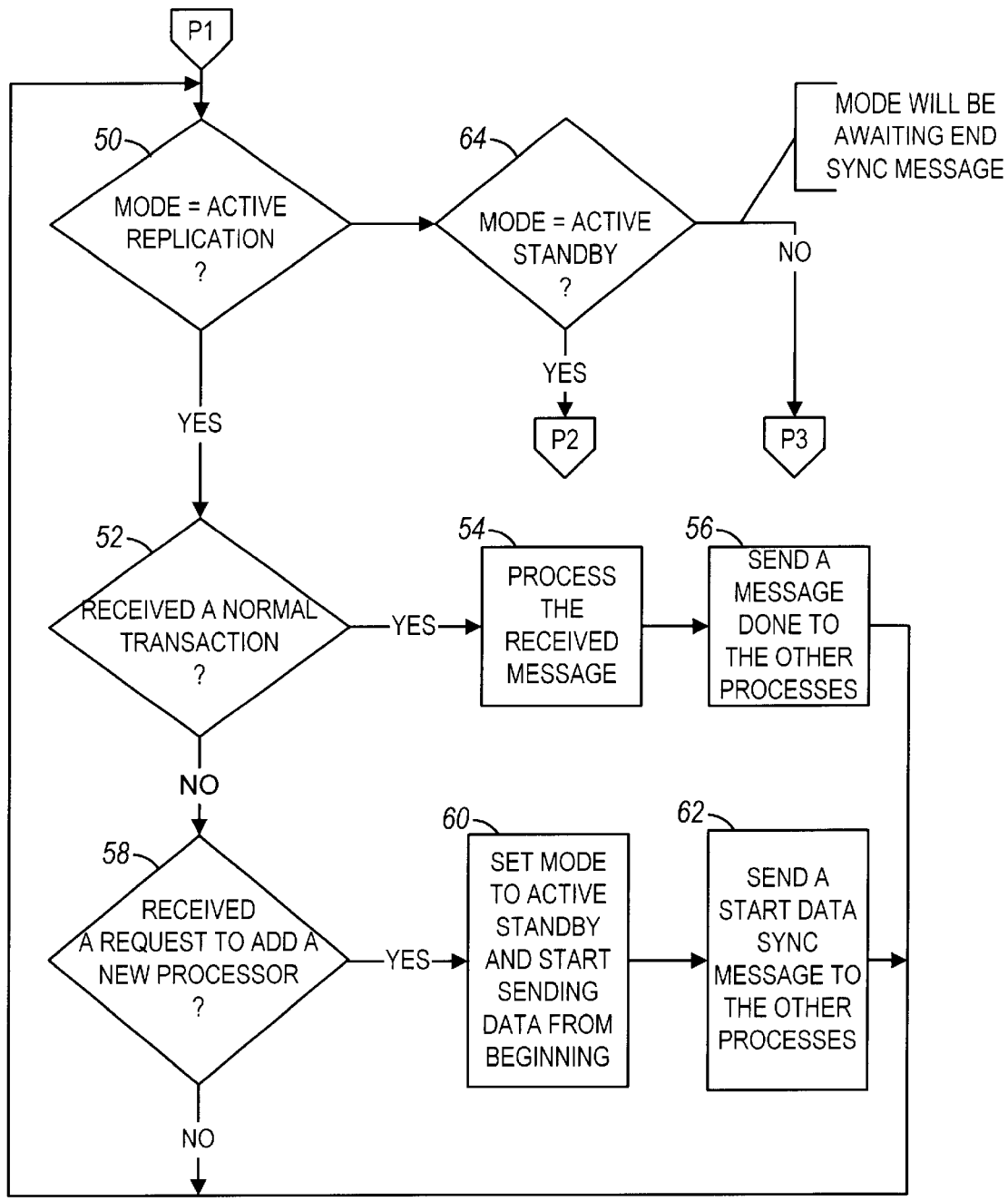
FIGS. 2, 3 and 4 depict a flow diagram representing decisions and actions taken by the primary CPU in the practice of the present invention.

An active or primary CPU commences at point or path P1 as shown in FIG. 2 and proceeds to decision block 50 to check whether or not the CPU, such as 12 in FIG. 1, is in an active-replication mode. If it is, a decision block 52 is entered to determine whether a normal transaction message has been received. If such a normal transaction message has been received, the received message is processed, a transaction is completed, and a message affirming completion is sent to the other CPUs as set forth in blocks 54 and 56 respectively before returning to decision block 50. If in block 52 the decision is NO, a decision block 58 checks to see if a request to add a new processor has been received. If not, there is again a return to block 50. However, if the result in block 58 is YES, a flag is set to change the mode of primary CPU 12 to active-standby and a process is commenced to start sending synchronization data to the new processor as set forth in a block 60. Further, a start data synchronization message is sent to any other backup CPUs in the group in accordance with a block 62 before returning to block 50. If the decision in block 50 results in a NO, the process goes to a decision block 64 to determine if the CPU is in an active-standby mode. If YES, the process proceeds to P2 in FIG. 3, otherwise it proceeds to P3 in FIG. 4.

Figure 3:
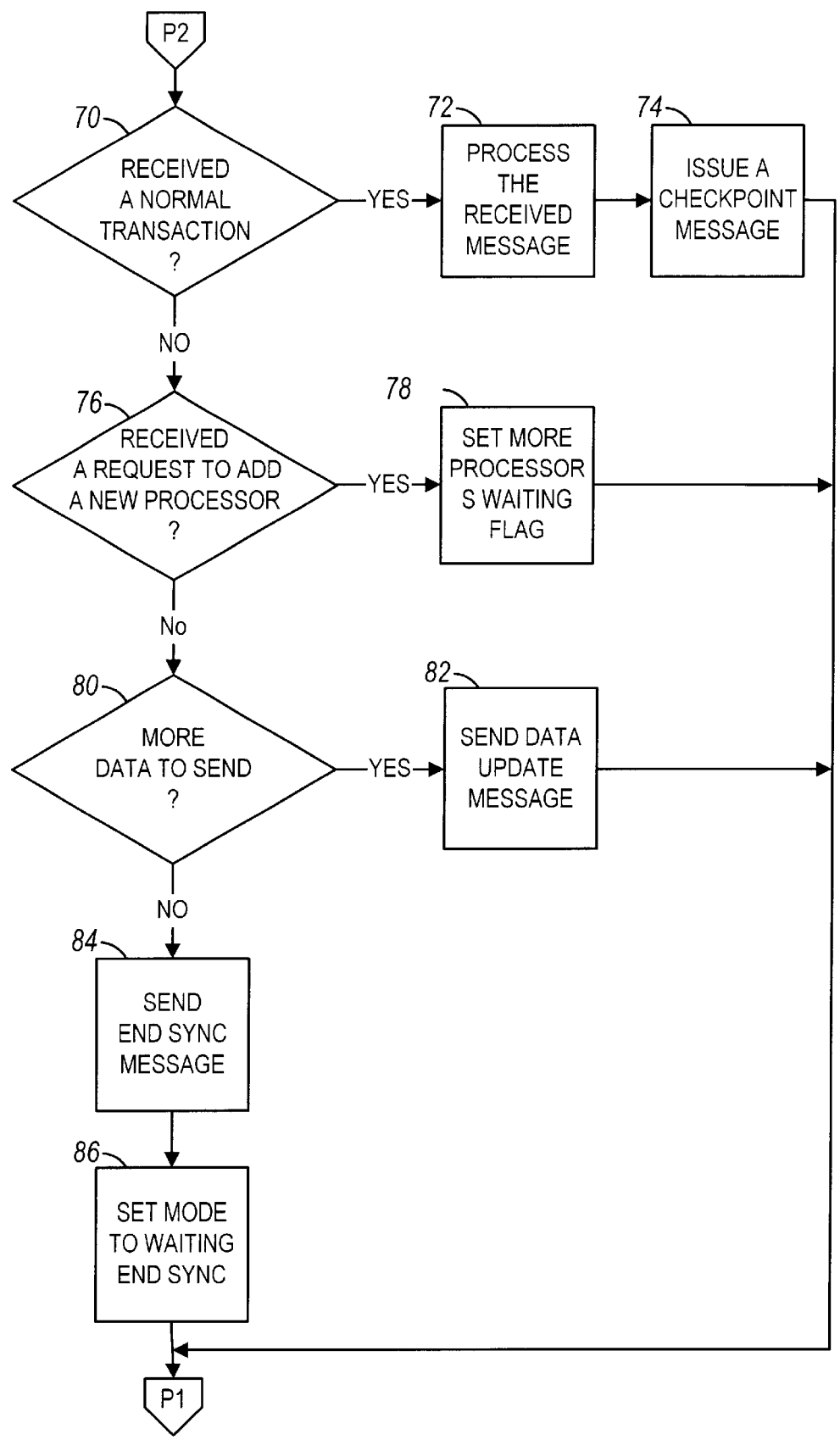

As indicated, the primary CPU is in an active-standby mode if it enters the P2 path of FIG. 3. The first decision is made in a block 70 where a determination is made as to whether or not the message received is a normal transaction in the same manner as determined in block 52. If it is, the message is processed, as set forth in a block 72, and a check-point message is transmitted as set forth in a block 74 before returning to the P1 input of FIG. 2. If the received message check is NO, a determination is made in a block 76 to see if the message is a request to add a new processor (not shown specifically in FIG. 1) in addition to the CPU 14 presently being synchronized. If so, a flag is set as stated in a block 78 to show that more CPUs are waiting to be synchronized before returning to P1 of FIG. 2. If the decision in block 76 is NO, the flow advances to a decision block 80 where a check is made to see if there are any more data sync records that need to be sent to CPU 14 before it is completely synchronized. If so, the next data record is sent as set forth in a block 82 before returning to P1. If block 80 determines NO, an "End Sync" message is sent and a flag is set to show that the primary CPU is awaiting a "End Sync" message from CPU 14 as set forth in blocks 84 and 86 respectively before returning to P1.

Figure 4:
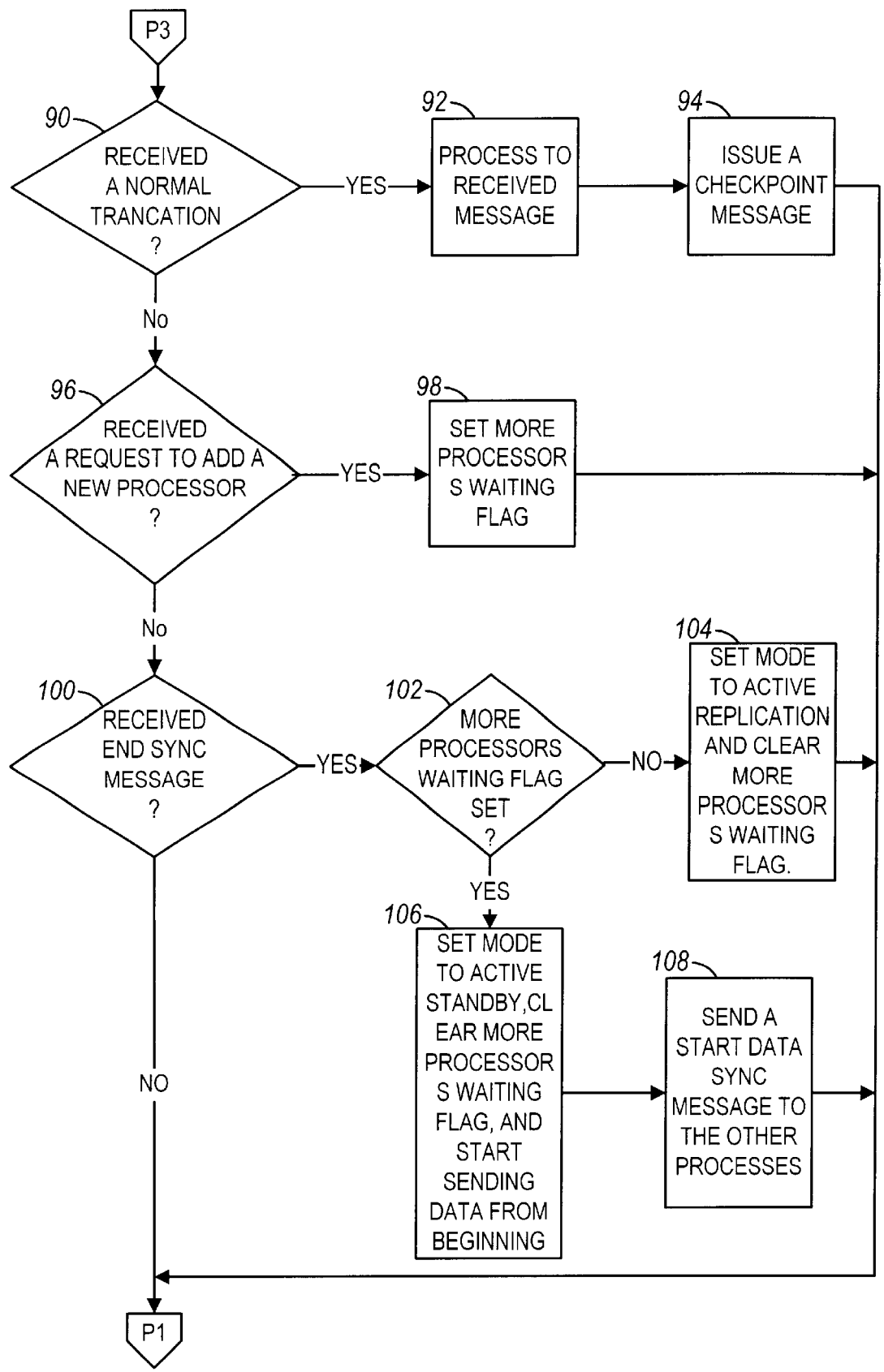

When the primary CPU 12 enters the flow of FIG. 4, it has finished sending data sync records to the CPU(s) presently being synchronized (CPU 14) and is awaiting confirmation from CPU 14 to that effect. In a decision block 90, a check is made to determine if the message received is a normal transaction in a manner similar to that of blocks 52 and 70. If it is a normal transaction message, it is processed and a check-point message is transmitted according to blocks 92 and 94 before returning to P1. If it is not a normal transaction message, the message is examined to see if it is a request to add a new processor in a block 96. If it is, a flag is set in a block 98, in the same manner as previously in block 78, before returning to P1. If the decision in block 96 is NO, a decision block 100 checks to determine whether or not it has received the expected "End Sync" message. If not, a return is made to P1, otherwise the process is advanced to a decision block 102 to ascertain if a flag has been set, as in blocks 78 and 98, indicating more processors are awaiting synchronization. If not, the mode of CPU 12 is returned to active-replication and the processors waiting flag is cleared as set forth in a block 104 before returning to P1. If the processors waiting flag is set, the mode is changed from waiting sync end to active-standby, the clear more processors waiting flag is cleared and data synchronization record messages are sent to the one or more additional CPUs that requested synchronization subsequent to the commencement of the synchronization process of the CPU(s) just finished as set forth in a block 106. A start data sync message is then sent to the already synchronized standby CPUs in accordance with a block 108 before returning to P1 of FIG. 2.

Figure 5A:
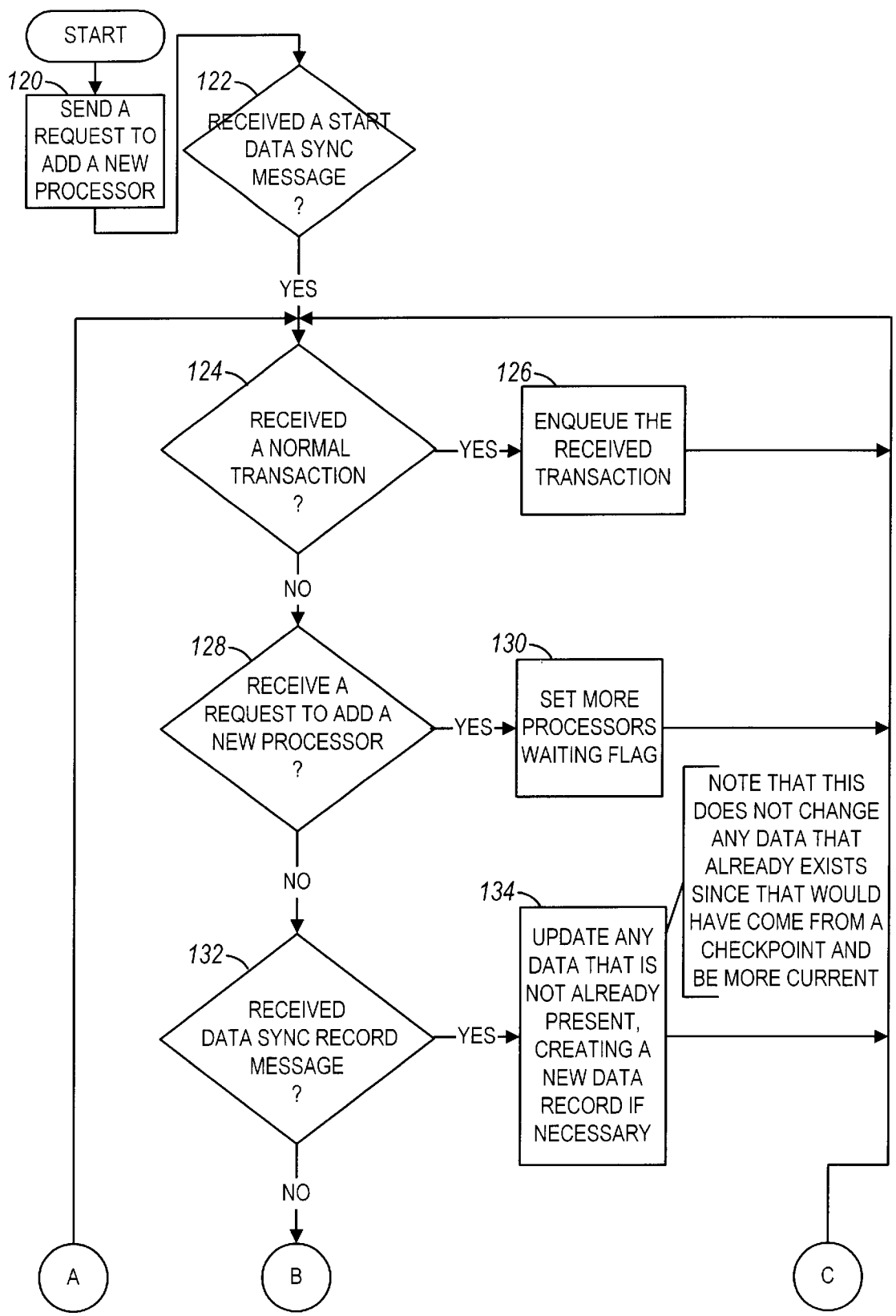
FIGS. 5A and 5B are a flow diagram representing the decisions and actions taken by a new CPU to be synchronized with the primary CPU in the practice of the present invention.
Figure 5B:
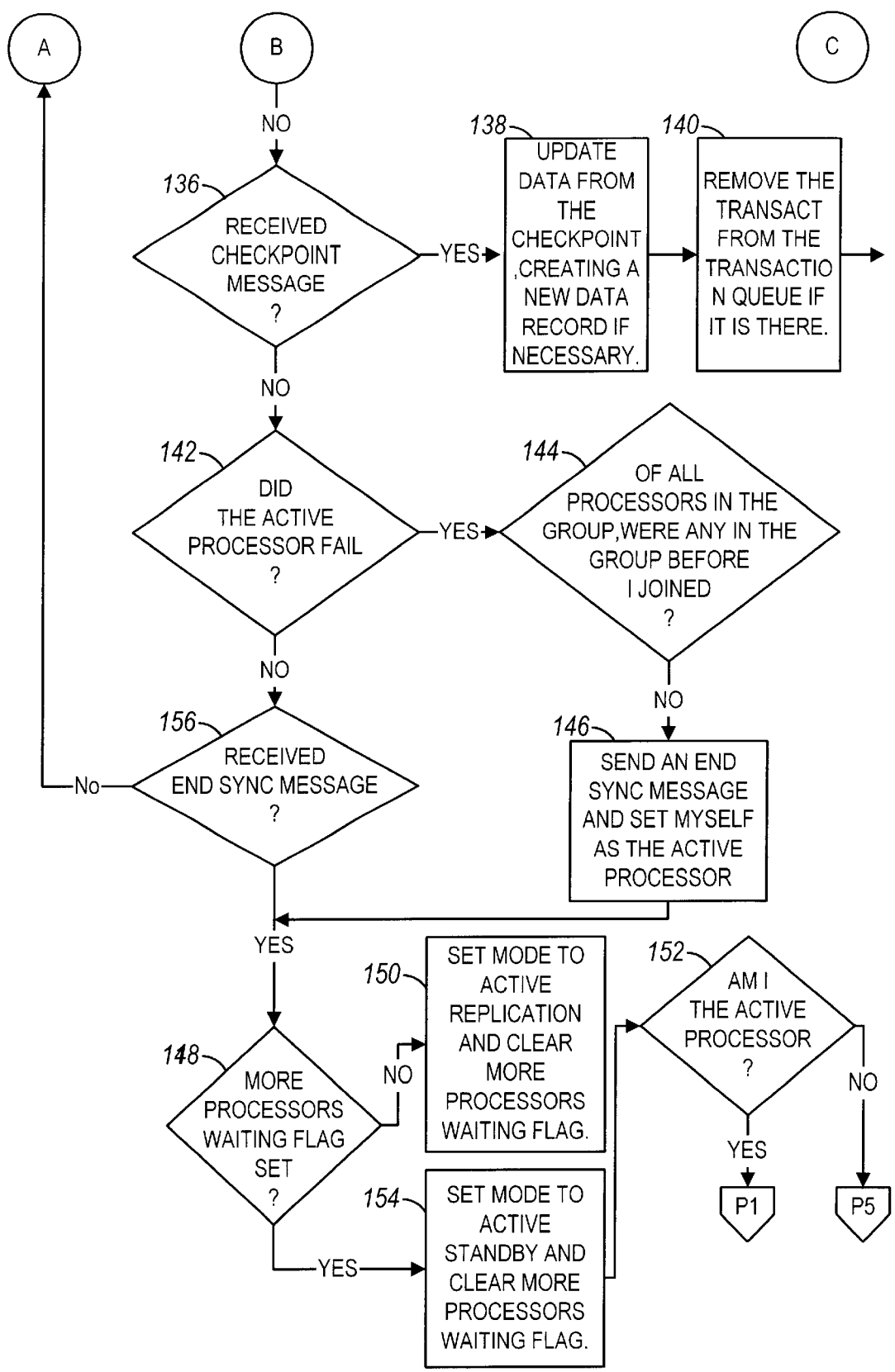

When a new processor or CPU comes online, it follows the procedure set forth in FIGS. 5A and 5B, referred to collectively herein as FIG. 5, until it is synchronized and then either goes to a standby or active condition in accordance with circumstances determined at the end of the flow chart of FIG. 5. While it is being synchronized, it receives all messages appearing on line 10 from external sources including flag setting messages distributed by the primary CPU 12. After initialization, the newly online processor sends an add new processor request message as set forth in a block 120 and then waits in a decision block 122 until it receives a start data sync message from primary CPU 12. Once a start data sync message is received, the process checks to see if the message received is a normal transaction message in a block 124. If so, the message is placed or queued in message list 24 in accordance with a block 126 and a return is made to decision block 124. If block 124 decides NO, a determination is made in a block 128 as to whether the message is a request by another CPU to be added to the awaiting sync list. If so, the appropriate flag is set in accordance with a block 130 before returning to block 124. Even though this CPU is not synchronized, such a flag needs to be set in this CPU in the event that it is called upon to be the primary processor before there is a return to an active-replication mode. If the determination in block 128 is NO, a check is made to determine if the message received is a data synchronization record as shown in a block 132. If so, unfilled fields are filled in any corresponding existing record that had already been created by check-point messages or a new record is created and filled with the data supplied as set forth in a block 134 and its accompanying explanatory note. If block 132 determines that the message received was not a data synchronization record, a block 136 determines if the message is a check-point message. If so, the check-point data is used to overwrite any corresponding fields in existing data records and to create new records where necessary as set forth in a block 138. The transaction is then removed from the message list 24 as set forth in a block 140 before returning to block 124. If the message was not a check-point message, a decision block 142 checks to see if there is any indication that the primary CPU 12 has failed. If so, a decision block 144 checks to see if any other active processor in the group have priority (have been previously synchronized and are still active) over this new processor. If there are, the process return to block 124. If not, an "End Sync" message is sent and this processor is set as the active processor as shown in a block 146 before advancing to a decision block 148 to determine if there is a flag set indicating more CPUs are awaiting synchronization. If no more CPUs are awaiting synchronization, the mode is changed to active-replication and the more processors waiting flag is cleared in accordance with a block 150 before advancing to a decision block 152. If the determination in block 148 is YES, there are other CPU(s) to be synchronized, the mode is set (reset) to active-standby and the more processors waiting flag is cleared as shown in a block 154 before advancing to block 152. If this new processor is now the active or primary processor, actions are taken as set forth in path P1 of FIG. 2 otherwise it proceeds to path P5 in FIG. 6 for standby CPUs. If the decision in block 142 is NO, a determination is made in a block 156 whether or not an "End Sync" message has been received. If so, the processor proceeds to block 148, otherwise it returns to block 124.

Figure 6:
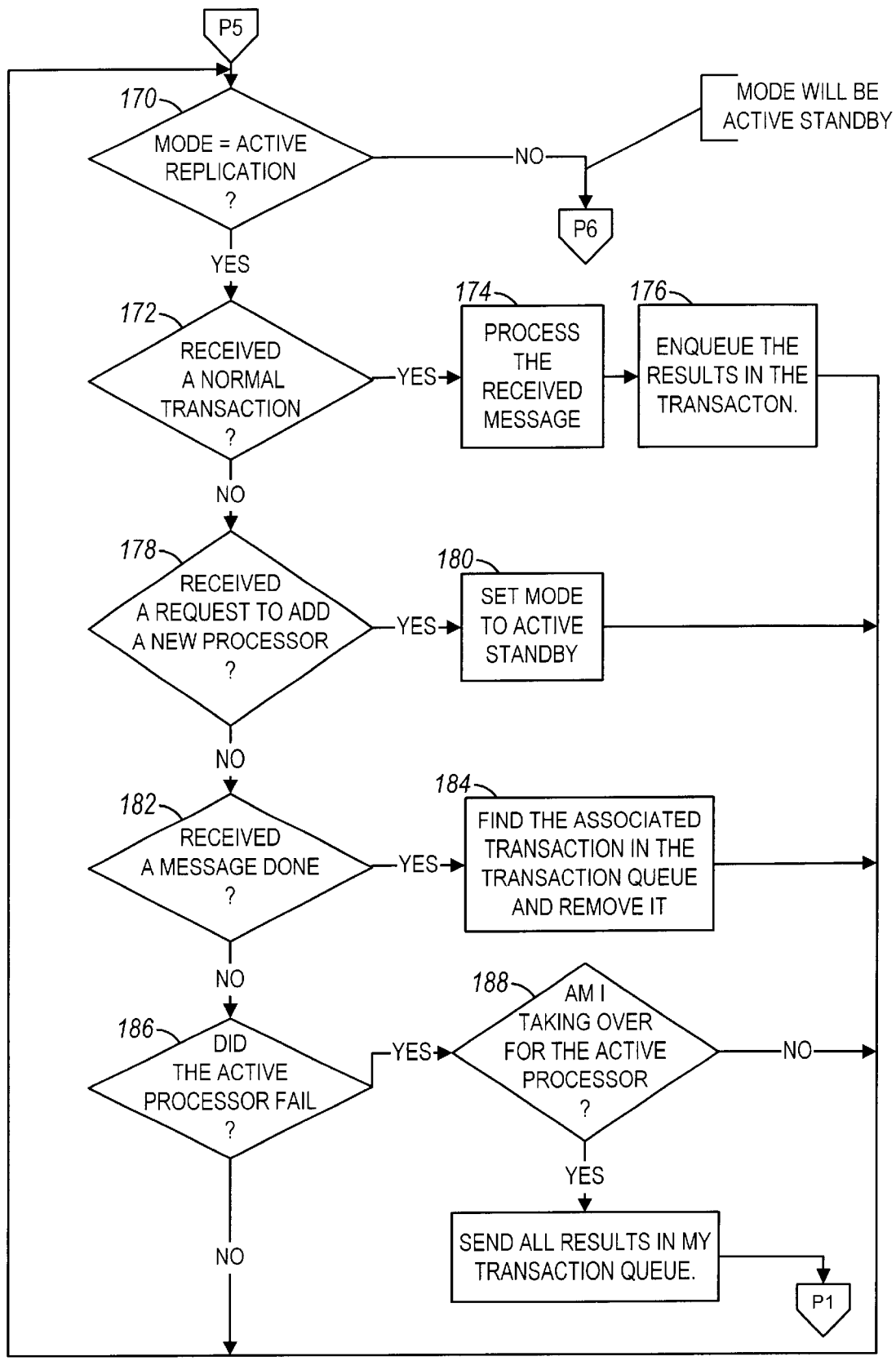
FIGS. 6, 7A and 7B comprise a flow diagram representing the decisions and actions taken by a standby CPU that is already in synchronization with the primary CPU in the practice of the present invention.
Figure 7A:
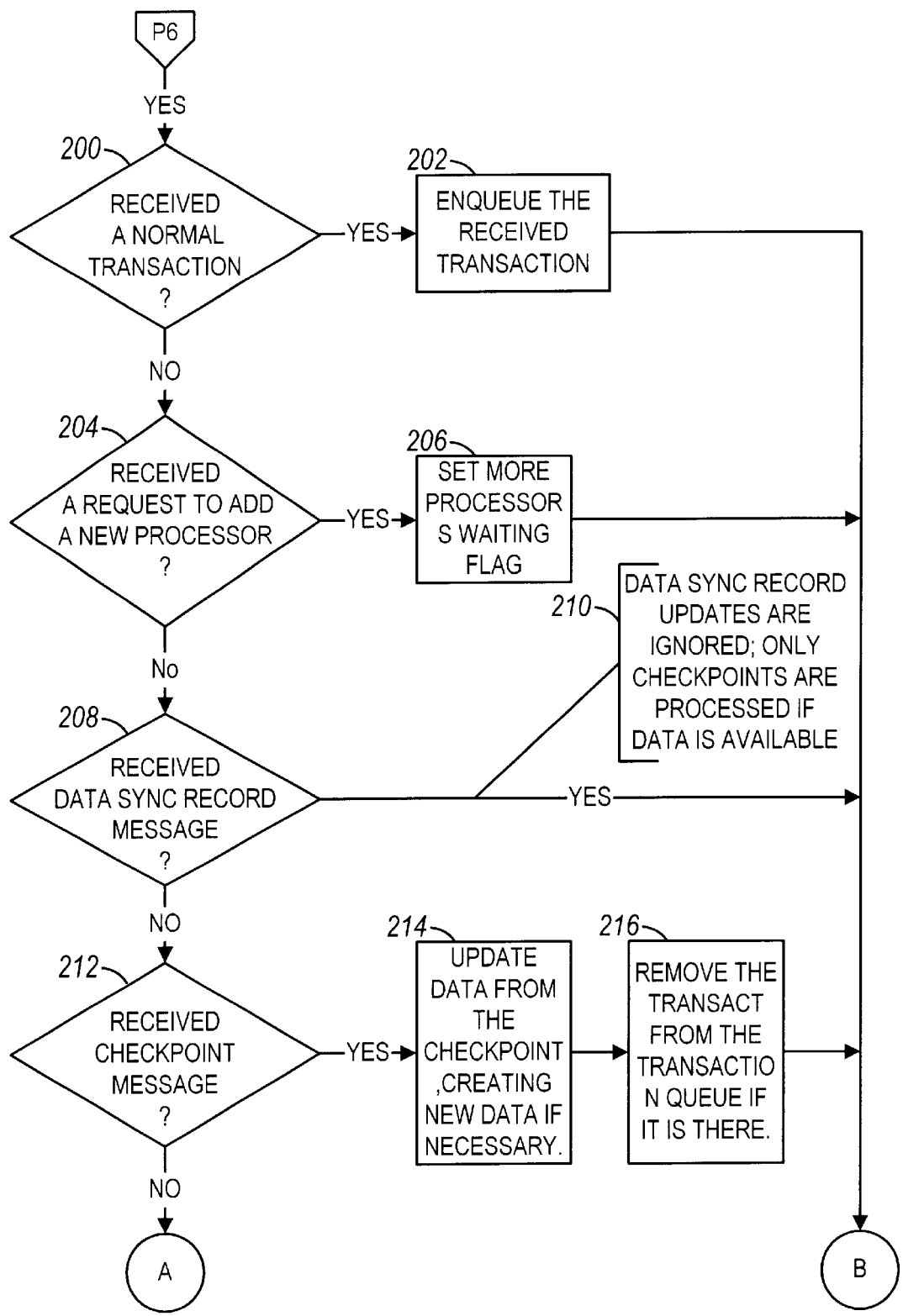
Figure 7B:
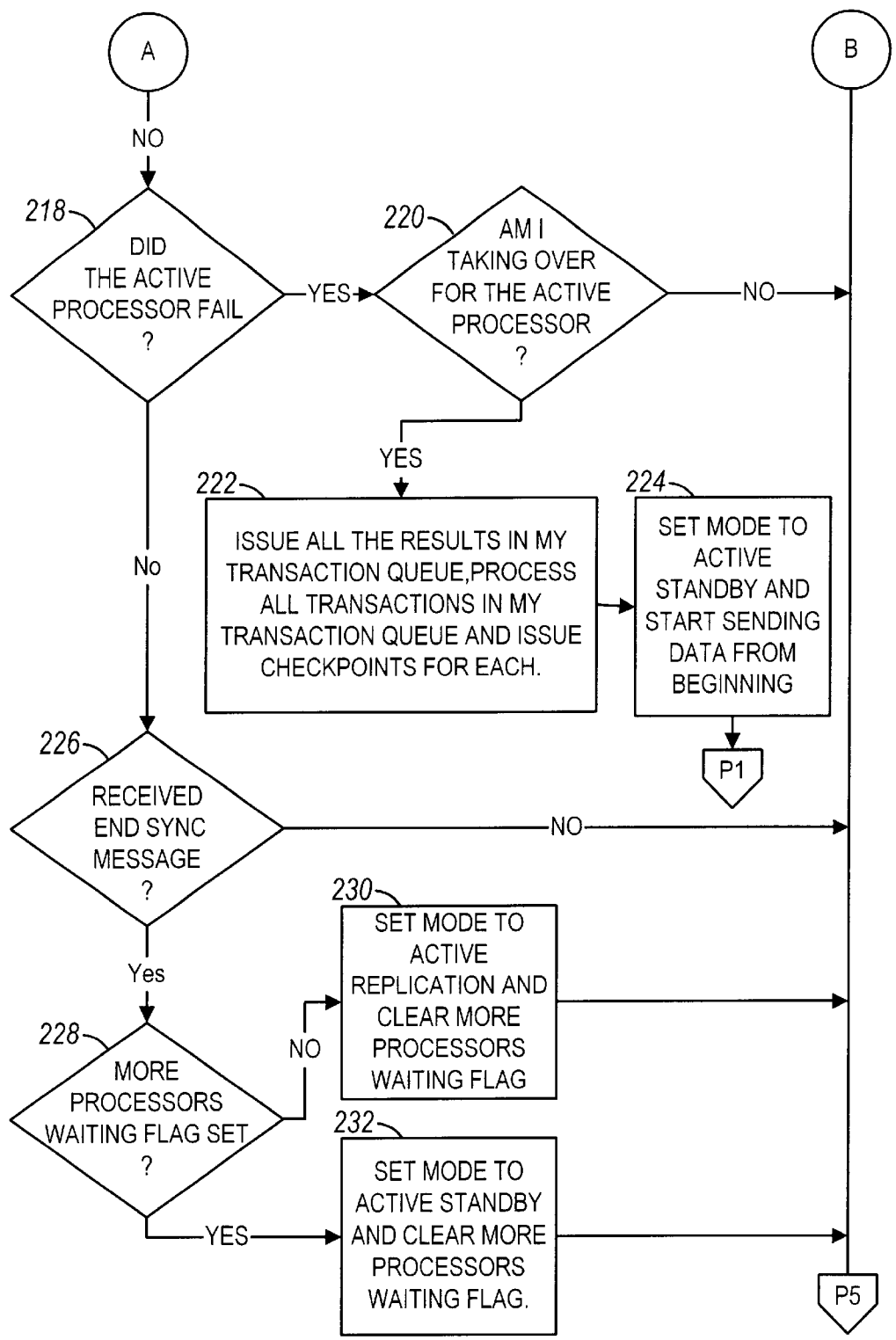

The flow chart of FIGS. 6, 7A, and 7B depict the steps taken by processors forming the standby or backup processor portion of the group practicing the present invention where FIG. 6 describes the active-replication mode, and FIGS. 7A and 7B, referred to collectively herein as FIG. 7, describe the active-standby mode. The starting point is designated as path P5 where a decision is first made, in a decision block 170, as to whether or not the system is in the active-replication mode. If not, the process proceeds via path P6 to FIG. 7; otherwise an advance is made to a decision block 172 to determine whether a received message is a normal transaction. If so, the message is processed and the results are enqueued in a transaction queue, as shown in blocks 174 and 176 before returning to P5. If block 172 determines the message is not a normal transaction, a check is made in a block 178 to see if the message is a request to add a new processor. If so, the mode of this processor is set to an active-standby mode as shown in block 180 before returning to path P5. If the result of block 178 is NO, a check is made, in a block 182, to see if the message received is an indication that the primary processor has finished a given transaction. If so, the associated transaction in the transaction queue is deleted as shown in a block 184 before returning to path P5. If the determination in block 182 is NO, a check is made, in a decision block 186, to see if the primary processor has failed. If not, the process returns to path P5 otherwise it proceeds to a decision block 188 to see if it is next in line to take over as the active processor. If not, a return is made to path P5, otherwise the results of the transaction queue are sent to all of the other standby processors in the group as set forth in a block 190 before proceeding to P1 in FIG. 2 for the procedures and transaction performed by the active processor.

When the fault tolerant processing group is in the active-standby mode, the steps of FIG. 7 are followed by each standby CPU starting with a decision block 200 which checks to see if a normal transaction message has been received. If so, it is queued as set forth in a block 202 and the CPU returns to P5 in FIG. 6, otherwise it proceeds to a decision block 204 where a check is made to determine if the message is a request for adding a new processor. If such a request has been received the more processors waiting flag is set as shown in a block 206 before returning to path P5 otherwise the process advances to a decision block 208. If a data synchronization record message or sync update is detected the process merely proceeds to path P5 since as a standby processor it has already been synchronized to the primary CPU for all the records and it only needs to be updated by check-point data as set forth in a note labeled 210. If block 208 determines NO, a check is made in a block 212 as to whether there is a check-point message. If so, the database is updated as set forth in a block 214 and the transaction is removed from the transaction queue as shown in a block 216 before returning to path P5. If there is no check-point message, the process advances to a decision block 218 to determine if the active CPU 12 has failed. If so, a check is made in a decision block 220 to determine if this standby processor has priority to take over as the primary CPU. If not, it proceeds to path P5, otherwise it issues the results of the transactions in its queue to the other standby processors, processes all transactions remaining in its transaction queue and issues check-point messages as appropriate as set forth in a block 222. It then sets (resets) the mode to active-standby and starts sending data synchronization records for any CPUs being synchronized from the beginning of its database, as set forth in a block 224 and then proceeds to path P1 as the primary CPU. If block 218 determines that the primary CPU has not failed, a decision block 226 checks to see if an "End Sync" message has been received. If not, it goes to path P5, otherwise it checks to see if the more processors waiting flag is set in a decision block 228. If not, the mode is returned to active-replication and the more processors waiting flag is cleared as shown in block 230. If on the other hand, the more processors waiting flag is set, the mode is set to active-standby and the more processors waiting flag is cleared as stated in a block 232. The next action for both blocks 230 and 232 is to proceed to path P5.

In summary, a primary CPU and any associated standby CPUs normally operate in an active-replication mode, as set forth in FIGS. 2 and 6 respectively, where each CPU processes all incoming messages generated external to the fault tolerant group. As each transaction is completed and the database of the primary CPU is updated, a message is forwarded to all standby CPUs that the indicated transaction is completed so that the standby CPUs may delete the transaction from their list of things to do in the event the primary CPUs fails and one of the standby CPUs must take over the function of the primary CPU. When a CPU is newly added to the group, it requests permission to be synchronized as set forth in FIG. 5. This message upon being received by the primary CPU and the standby CPUs causes them to revert to an active-standby mode. The standby CPUs react as set forth in FIG. 7 while the primary CPU reacts as set forth in FIG. 3 until it has sent copies of all records and updates to the one or more recently added CPUs. The primary CPU then awaits confirmation in the manner set forth in FIG. 4 before returning to the procedure of FIG. 2. At this time all standby CPUs revert to the steps set forth in FIG. 6.

It will be apparent from an analysis of the above, that a given CPU operating as a primary processor in an active-replication mode can process more external messages per unit of time than can the same CPU operating as a primary processor in an active-standby mode since no check-point (updating) messages need to be distributed to standby CPUs in an active-replication fault tolerant system. By switching to an active-standby mode, whenever synchronization of a newly added CPU is required, processing of external messages still continues. Even though such processing occurs at a reduced rate, the overall result is far superior to the prior art active-replication configurations which required stoppage of processing during synchronization. This stoppage of processing occurred in the prior art whether or not an attempt was made to store all incoming external messages in some storage facility whereby these messages would be processed later after resynchronization has been completed.

Although the invention has been described with reference to a specific embodiment, these descriptions are not meant to be construed in a limiting sense. Various modifications of the disclosed embodiment, as well as alternative embodiments of the invention, will become apparent to persons skilled in the art upon reference to the description of the invention. It is therefore contemplated that the claims will cover any such modifications or embodiments that fall within the true scope and spirit of the invention.

What is claimed is:

1. A fault tolerant system using total order and normally operating in an active-replication mode comprising:

a primary CPU normally operating in an active-replication mode;

a backup CPU interconnected with the primary CPU, the backup CPU requiring synchronization with the primary CPU;

means for sending an "add me" request signal from said backup CPU to said primary CPU to cause said primary CPU to temporarily switch to an active-standby mode;

means for sending a "finished" signal from said primary CPU to said backup CPU when copies of all data synchronization records have been transmitted to said backup CPU; and means causing both said primary and said backup CPUs to revert to an active-replication mode substantially immediately after transmission of said "finished" signal.

2. The system of claim 1 further comprising:

means for sending check-point messages to said backup CPU during the time said primary CPU is operating in an active-standby mode;

means for receiving and storing external messages at both said primary and backup CPUs at all times said CPUs are operational; and means for processing said external messages at said backup CPU only when said CPUs comprising said fault tolerant system are operating in an active-replication mode.

3. A method of synchronizing a newly added CPU in a fault-tolerant signal processing system normally operating in an active-replication mode comprising the steps of:

changing a primary CPU to operate in an active-standby mode with respect to a backup CPU to be synchronized when said primary CPU is notified that said backup CPU is ready to be synchronized;

supplying a notification to said backup CPU that copies of all data synchronization records have been transmitted to said backup CPU; and changing said primary and said backup CPUs to an active-replication mode substantially immediately after transmission of said notification.

4. The method of claim 3 further comprising:

sending check-point messages to said backup CPU during the time said primary CPU is operating in an active-standby mode;

receiving and storing external messages at both said primary and backup CPUs at all times said CPUs are operational; and processing said external messages at said backup CPU only when said the CPUs comprising said fault tolerant system are operating in an active-replication mode.

5. A method of synchronizing a recently added backup CPU in a fault tolerant signal processing system normally operating in an active-replication mode comprising the steps of:

changing a primary CPU and any already synchronized standby CPUs to operate in an active-standby mode when a notification is received that a further CPU is ready to be synchronized;

supplying an end of record transmission notification to said further CPU that copies of all data synchronization records have been transmitted to said further CPU; and changing said primary CPU and any standby CPUs to an active-replication mode upon receipt of a reply to said end of record transmission notification.

6. A processing apparatus for use in a fault tolerant process system comprising:

CPU means operable to be synchronized to a primary CPU in a process group while the primary CPU continues processing and simultaneously supplies data synchronization records and check-point messages in an active-standby mode to complete the synchronization of a database and combination transaction queue and message list;

means within said CPU means for switching to a standby processor mode in an active-replication mode when synchronization of all recently added CPUs is complete and the primary CPU continues to process incoming messages in accordance with design specifications; and means within said CPU means for operating said CPU means in a primary CPU active-replication mode with respect to any standby CPUs when failure of the previously primary CPU is detected and all other CPUs in the process group have less priority, in accordance with a predefined set of conditions, than said CPU means.

7. The apparatus of claim 6 wherein the predefined set of conditions comprises less time in a synchronized condition.

8. A computer program product for use in combination with a CPU of a fault tolerant process system, the computer program product having a medium with a computer program embodied thereon, the computer program comprising:

computer program code for causing a newly online first CPU to be synchronized by receiving updating check-point messages and data synchronization records from a primary CPU in a process group while the primary CPU continues processing in an active-standby mode until synchronization of a database and combination transaction queue and message list is completed;

computer program code for causing said first CPU to switch to a standby processor in an active-replication mode when synchronization is complete and the primary CPU continues to process incoming messages in accordance with predetermined conditions; and computer program code for causing said first CPU to operate in a primary CPU active-replication mode with respect to any interconnected standby CPUs comprising a part of a process group when failure of the previously primary CPU is detected and all other CPUs in the process group have less priority, in accordance with a predefined set of conditions, than said first CPU.

9. A method of operating a CPU used in a fault tolerant process system comprising the steps of:

causing a newly online first CPU to be synchronized by receiving updating check-point messages and data synchronization records from a primary CPU in a process group while the primary CPU continues processing in an active-standby mode until synchronization of a database and combination transaction queue and message list is completed;

causing said first CPU to switch to a standby processor mode in an active-replication mode when synchronization is complete and the primary CPU continues to process incoming messages in accordance with predetermined conditions; and causing said first CPU to operate in a primary CPU active-replication mode with respect to any interconnected standby CPUs comprising a part of a process group when failure of the previously primary CPU is detected and all other CPUs in the process group are determined to have less priority than said first CPU.

10. A fault tolerant signal processing system normally operating in an active-replication mode comprising:

at least a primary CPU operable to maintain synchronization with any operable standby CPUs in an active-replication mode;

means within any CPU newly placed on-line for sending a message to said primary CPU requesting that it be synchronized with said primary CPU;

means within said primary CPU and any operable standby CPUs for changing to an active-standby mode until the CPU newly placed on-line is synchronized; and means within all CPUs for returning to an active-replication mode for normal operation.

11. A method of synchronizing newly added standby CPUs to a fault tolerant signal processing system group normally operating in an active-replication mode comprising:

sending a message to from a CPU newly placed on-line, to a primary CPU, requesting that it be synchronized with said primary CPU;

changing all CPUs in the group to operate in an active-standby mode until the CPU newly placed on-line is synchronized; and returning all CPUs to an active-replication mode when synchronization of all CPUs in a group occurs.

12. A method of operating a primary CPU used in a fault tolerant process system comprising the steps of:

switching from an active-replication mode to an active-standby mode upon receiving a request for synchronization from a newly online CPU; and sending an end of record transmission notification to the newly online CPU that copies of all data synchronization records have been transmitted to the newly online CPU and then returning to an active-replication mode when synchronization is complete.

13. The method of claim 12 comprising the additional step of sending updating check-point messages and data synchronization records to the newly online CPU while the primary CPU continues processing in an active-standby mode until synchronization of a database and combination transaction queue and message list is completed.

* * * * *

UNITED STATES PATENT AND TRADEMARK OFFICE
CERTIFICATE OF CORRECTION

PATENT NO. : 6,421,741 B1
DATED : July 16, 2002
INVENTOR(S) : Trenton Corey Minyard It is certified that error appears in the above-identified patent and that said Letters Patent is hereby corrected as shown below:

Column 10,
Line 28, delete "to"

Signed and Sealed this

Tenth Day of December, 2002

JAMES E. ROGAN
*Director of the United States Patent and Trademark Office*